United States Patent
Oba

(10) Patent No.: US 6,745,278 B2
(45) Date of Patent: Jun. 1, 2004

(54) COMPUTER CAPABLE OF REWRITING AN AREA OF A NON-VOLATILE MEMORY WITH A BOOT PROGRAM DURING SELF MODE OPERATION OF THE COMPUTER

(75) Inventor: Kaori Oba, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 19 days.

(21) Appl. No.: 09/753,112

(22) Filed: Jan. 2, 2001

(65) Prior Publication Data

US 2001/0008011 A1 Jul. 12, 2001

(30) Foreign Application Priority Data

Jan. 6, 2000 (JP) ........................................ 2000-001115

(51) Int. Cl.[7] .............................................. G06F 12/00
(52) U.S. Cl. ..................................... 711/103; 711/145
(58) Field of Search ................................ 711/103, 102, 711/2, 170, 145; 713/2

(56) References Cited

U.S. PATENT DOCUMENTS 5,819,087 A    10/1998   Le et al.
6,205,548 B1 *  3/2001   Hasbun et al. ................. 713/2
6,237,120 B1 *  5/2001   Shimada et al. ............ 714/726
6,330,634 B1 * 12/2001   Fuse et al. ................... 711/103
6,388,763 B1 *  5/2002   Han ........................... 358/1.16

FOREIGN PATENT DOCUMENTS

| JP | 8-255084   | 10/1996 |
| JP | 10-149282  | 6/1998  |
| JP | 11-39151   | 2/1999  |
| JP | 11-175346  | 7/1999  |

* cited by examiner

*Primary Examiner*—Kimberly McLean-Mayo
(74) *Attorney, Agent, or Firm*—Scully, Scott, Murphy & Presser

(57) ABSTRACT

There is provided a computer that can safely rewrite any one of the areas where a boot program is stored with fewer actions in the self-mode. A nonvolatile memory is divided into a plurality of areas, each of which is separately erasable and includes a user area and a boot area designation flag indicating whether the corresponding user area is specified as a boot area. An area designation flag specifies the user area containing a boot program among a plurality of user areas. A CPU sets the value of the area designation flag based on the values of a plurality of boot area designation flags. When a system is started, the user area including the program for starting the operation of the CPU is determined based on the value of the area designation flag.

10 Claims, 4 Drawing Sheets

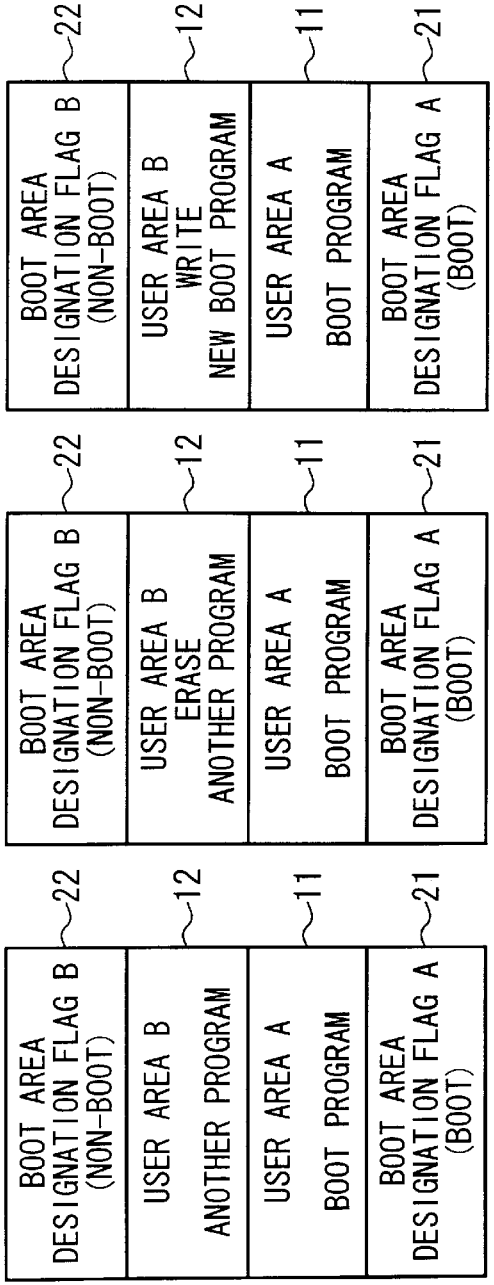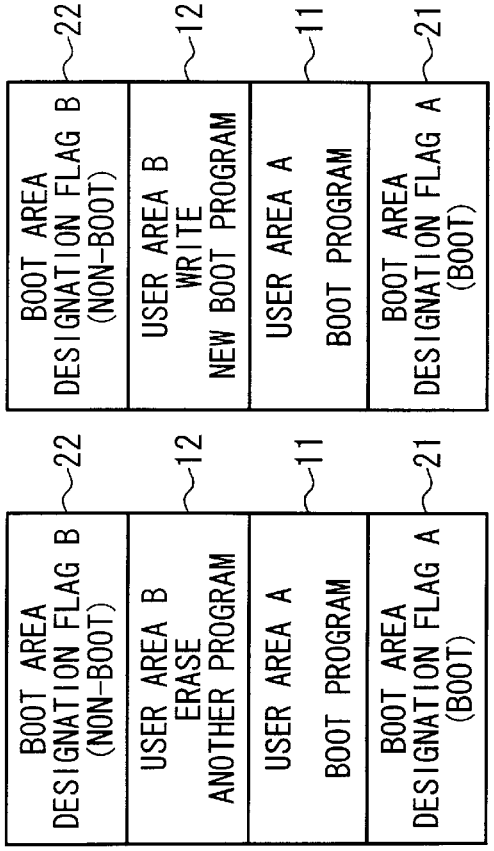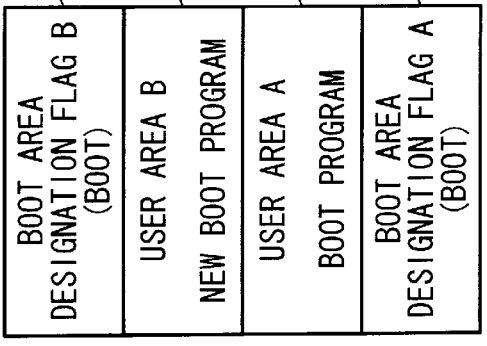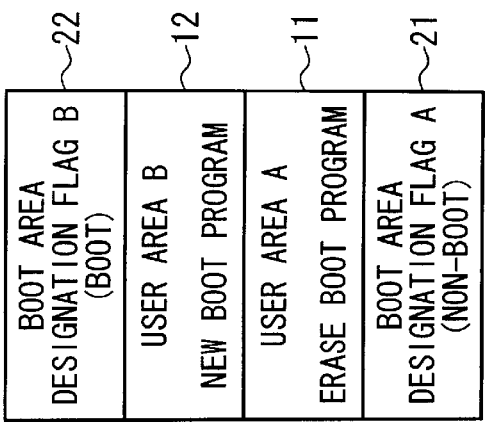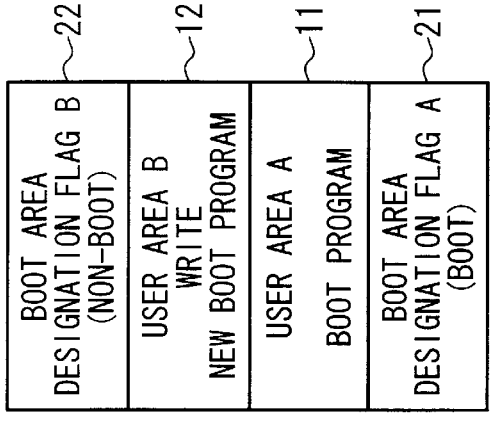

COMPUTER CAPABLE OF REWRITING AN AREA OF A NON-VOLATILE MEMORY WITH A BOOT PROGRAM DURING SELF MODE OPERATION OF THE COMPUTER

BACKGROUND OF THE INVENTION

1. Field of the Invention

The present invention relates to a computer, and in particular, to techniques for rewriting the contents of a nonvolatile erasable memory, which stores computer programs, when a user operates a computer.

2. Description of the Related Art

A conventional computer, which is built into equipment such as an automobile and controls the operation of the equipment, has a structure as shown in FIG. 4.

When a computer operates in the writer-rewriting mode in which a writer device (not shown in the figures) placed in a factory rewrites the contents of a nonvolatile memory 6, a CPU (Central Processing Unit) 2 starts the execution of instructions contained in programs that are stored in a boot memory 7.

On the other hand, when the computer operates in the user mode in which a user operates the computer, the CPU 2 starts the execution of instructions contained in programs that are stored in a user area A61 of the nonvolatile memory 6 in accordance with a directive sent from a start address selection circuit 8.

Additionally, when the computer operates in the self-mode in which the contents of the nonvolatile memory 6 are rewritten (re-programmed) during which a user operates the computer, instructions that are necessary for the rewriting operation in addition to a boot program are transferred to a RAM (Random Access Memory) 5 from the nonvolatile memory 6 or from the outside of the computer. Subsequently, the CPU 2 reads out the boot program and the instructions from the RAM 5, and then the CPU 2 executes these to rewrite the contents of the nonvolatile memory 6.

According to the above-described technique, however, it may become impossible for the computer to continue to operate normally if a short break in the supply of power occurs during the erasure operation of the user area A61 of the nonvolatile memory 6 where programs including the boot program are stored. Hereafter, the term "boot program" may be used as the representative of these programs including the boot program for convenience.

Furthermore, even if the erasure operation is successfully completed, if a short break in the supply of power occurs while a new boot program is written into the nonvolatile memory 6, the writing operation may be carried out incompletely.

In the above cases, even if a reset operation of the system were attempted to restart the system, it would be impossible to successfully restart the system because the new boot program was incompletely rewritten. In this way, the conventional computer as stated above has a problem in that the user area A61 where a boot program may be stored cannot be safely erased in the self-mode.

In order to solve this problem, techniques for safely rewriting the contents of a user area where a boot program is stored are disclosed in Japanese Unexamined Patent Application, First Publication, Nos. Hei 8-255084 and Hei 10-149282.

Both publications employ a technique wherein when rewriting the boot program stored in a boot area, which corresponds to the user area A61 shown in FIG. 4, the old boot program (i.e. the boot program currently used) is copied to an empty user area in order to back up this old boot program, and then the contents of the boot area are erased, after that a new boot program is written into the boot area, and then the old boot program that was copied to the empty user area is erased provided that the writing operation of the new boot program has been successfully completed.

According to this technique, even if the new boot program were incompletely written because of a short break in the supply of power, the old boot program makes it possible to restart the system, thus a situation in which the restoration of the system becomes impossible can be avoided.

The above-described technique, however, causes a problem in that it is required to perform many actions such as a copying operation of the old boot program to the empty user area, and an erasure operation of the old boot program once it is no longer necessary because of the completion of the writing operation of the new boot program. Therefore, the handling is complicated and substantial time is required to carry out the rewriting operation.

SUMMARY OF THE INVENTION

It is therefore an object of the present invention to provide a computer that is capable of safely rewriting boot programs stored in a nonvolatile memory with fewer actions in the self-mode (i.e. a mode for re-programming the contents of the nonvolatile memory with the nonvolatile memory being mounted onto a printed circuit board when a user operates the computer) by providing flags for every user area for specifying the boot area.

A computer according to the present invention is provided with: a nonvolatile memory which is divided into a plurality of divided areas, each divided area being separately erasable and including a user area and a boot area designation flag indicating whether the corresponding user area is specified as a boot area; an area designation flag register which specifies the user area including a boot program among a plurality of user areas; and a processor which sets the value of the area designation flag register based on the values of a plurality of boot area designation flags, wherein the user area which stores the program for starting the operation of the processor is determined based on the value of the area designation flag register.

Since the present invention is provided with boot area designation flags and an area designation flag register, it is possible to switch the user area that contains a boot program for starting a system, and the rewriting of a boot program stored in the nonvolatile memory can always be carried out with the presence of the old boot program that is currently used. For this reason, even if a rewriting operation has not been completed normally due to a short break in the supply of power while the rewriting operation is carried out in the self-mode, it possible to restore the system by performing the rewriting operation once again. Accordingly, the rewriting operation can be performed with fewer actions in a short period.

BRIEF DESCRIPTION OF THE DRAWINGS

FIGS. 3A to 3E are explanatory diagrams illustrating process for rewriting a boot program stored in a user area of a nonvolatile memory, FIG. 3A showing a state before the rewriting, FIG. 3B showing a state after erasing another program stored in a user area B12, FIG. 3C showing a state after writing a new boot program into the user area B12, FIG. 3D showing a state after setting a boot area designation flag B22 to "boot", and FIG. 3E showing a state after erasing the boot program stored in a user area A11.

DETAILED DESCRIPTION OF THE PREFERRED EMBODIMENTS

Figure 1:
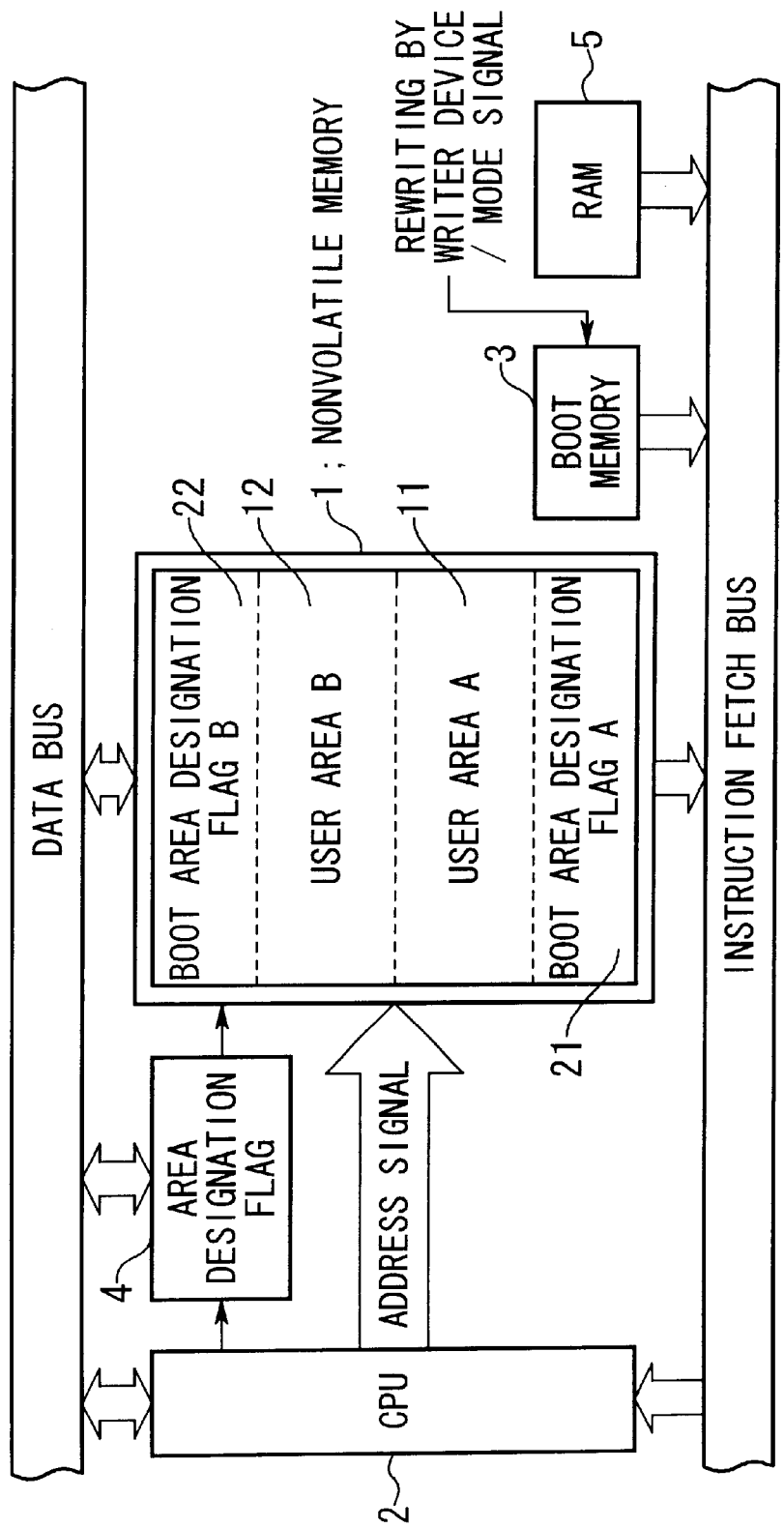
FIG. 1 is a block diagram showing the structure of a computer that is capable of rewriting a boot program when a user operates the computer in accordance with an embodiment of the present invention.

Hereafter, an embodiment of the present invention will be explained with reference to the drawings. FIG. 1 is a block diagram showing the structure of a computer in accordance with an embodiment of the present invention. This computer is capable of rewriting a boot program while a user operates the computer in the self-mode.

In FIG. 1, reference numeral 1 denotes a nonvolatile memory that may store programs, each of which may include a boot program, and comprises two user areas A11 and B12 and the corresponding boot area designation flags A21 and B22. A boot area designation flag containing "0" indicates that the corresponding user area is specified as the boot area. Conversely, a boot area designation flag containing "1" indicates that the corresponding user area is not specified as the boot area.

A CPU 2 is the main processor for carrying out various controls and computations in accordance with programs stored in the nonvolatile memory 1. A boot memory 3 stores a program with a function for starting the operation of a system in accordance with a specified control mode. When starting the system, a boot program is primarily executed among the programs stored in the nonvolatile memory 1.

A boot program is rewritten in accordance with the writer-rewriting mode when the computer is operating alone in a factory. Conversely, the CPU 2 rewrites boot programs in accordance with the self-mode when a user operates the computer. An area designation flag 4 stored in a register (not shown in the figures) specifies a user area where a boot program, which will be used when starting the system, is stored. A RAM 5 temporarily stores data that are necessary to carry out various operations in accordance with directives from the CPU 2.

Figure 2:
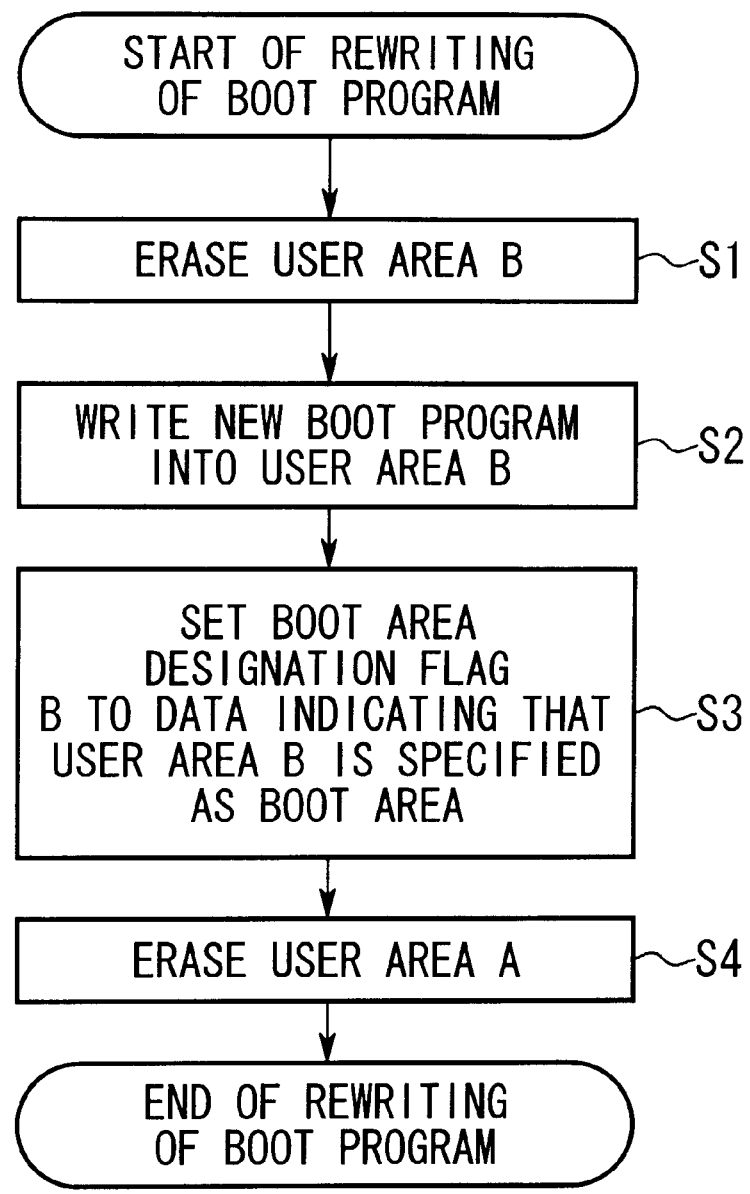
FIG. 2 is a flowchart showing a procedure for rewriting a boot program.
Figure 4:
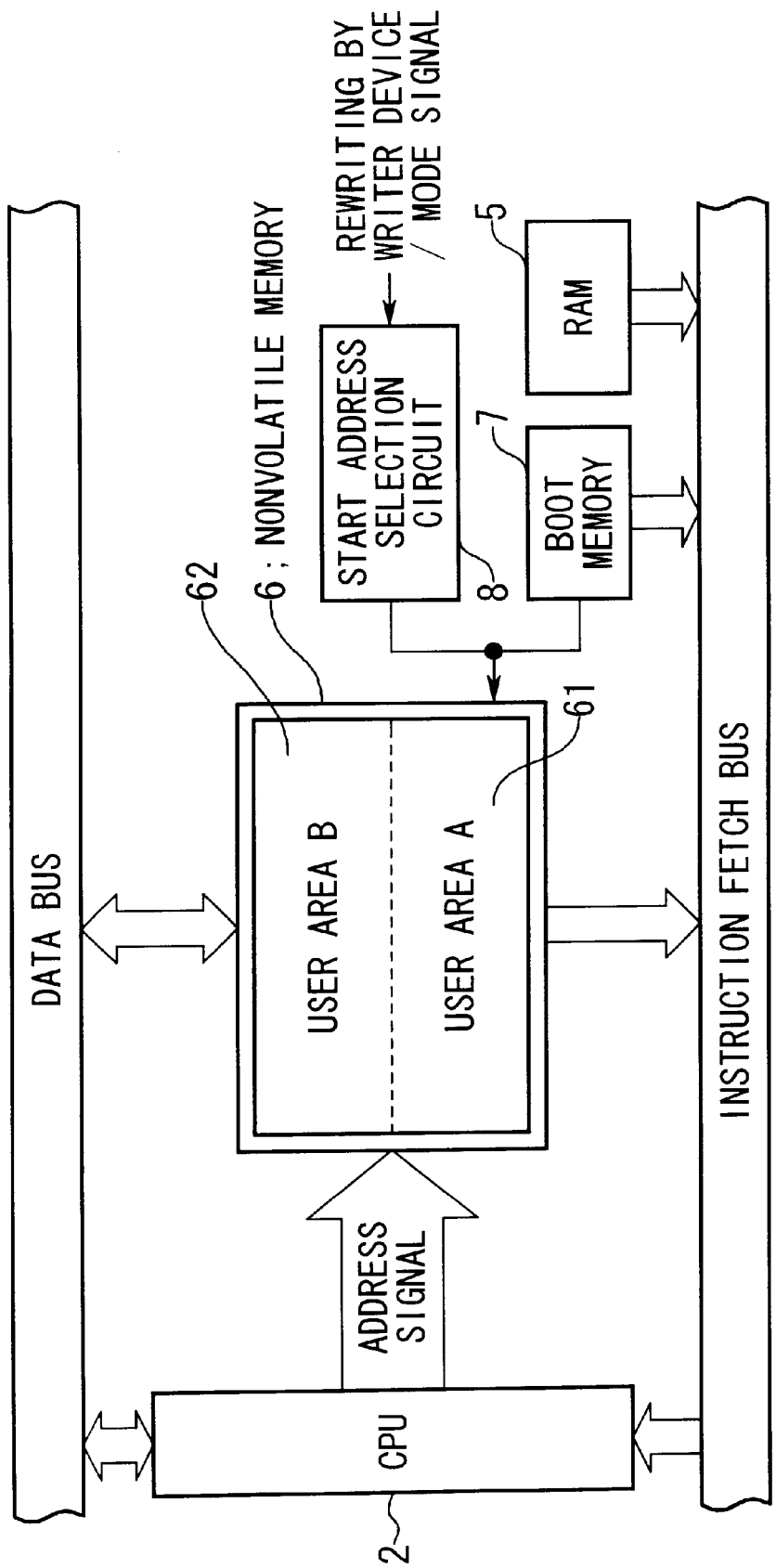
FIG. 4 is a block diagram showing the structure of a computer in accordance with a related art.

A procedure for rewriting programs, which may include a boot program and are stored in a user area, in the self-mode performed by a computer with the above-stated structure will be explained with reference to FIG. 2. In the following, description will be given for a case where the user area A11 is specified as a boot area (namely, when the boot area designation flag A21 contains "0" and the boot area designation flag B22 contains "1"). Here, when the contents of the nonvolatile memory 1 have been erased, all the bits erased are set to "1."

First, in step S1, the CPU 2 instructs the nonvolatile memory 1 to erase the contents of the user area B12, to which a new boot program will be written, and the boot area designation flag B22. Next, in step S2, the CPU 2 writes the new boot program into the user area B12. Then in step S3, the CPU 2 writes data indicating that the user area B12 is specified as a boot area (i.e. the data "0") into the boot area designation flag B22.

Subsequently, in step S4, the CPU 2 erases the contents of the user area A11 and the corresponding boot area designation flag A21 only if the processes in steps S2 and S3 have been successfully completed. As a result, the contents of the boot area designation flag A21 is set to "1." Hereafter, the CPU 2 does not write any data into the boot area designation flag A21, so that the flag remains set at "1." Next, the CPU 2 writes another program, which is a program other than a boot program, into the user area A11 as the need arises.

When the system is restarted due to a reset operation during which the computer operates in the user mode, the CPU 2 reads out programs stored in the boot memory 3 and then executes these programs. As a result, the CPU 2 reads out the values of the boot area designation flags A21 and B22 to determine which of the user areas A11 or B12 has the newer boot program. Based on the determination result, the CPU 2 sets the area designation flag 4 to the data indicating the determined user area. When the system is restarted next time, the CPU 2 makes the processing branch to the new boot program stored in the user area specified by the area designation flag 4, and then the CPU 2 reads out the contents of the new boot program.

Here, a plurality of user areas may be specified as boot areas, when a short break in the supply of power occurs during the period starting at the completion of the process in step S3 and ending before the completion of the process in step S4. In such a case, the CPU 2 specifies a predetermined user area (e.g., the user area A11) as the boot area in preference to the other user areas.

FIGS. 3A to 3E show a time series transition of the contents of the user areas and the corresponding boot area designation flags during the processing for rewriting a boot program.

More specifically, FIG. 3A shows a state before rewriting a boot program. As is apparent from the figure, the user area A11 stores a boot program, and the boot area designation flag A21 is set to "boot." Further, the user area B12 stores another program that is different from a boot program, and the boot area designation flag B22 is set to "non-boot."

Further, FIG. 3B shows a state after erasing another program stored in the user area B12. FIG. 3C shows a state after writing a new boot program into the user area B12. FIG. 3D shows a state after setting the boot area designation flag B22 to "boot." FIG. 3E shows a state after erasing the boot program stored in the user area A11. Owing to this erasure operation, the boot area designation flag A21 is set to "non-boot." Thus, it is possible to write a new program into the user area A11 because the boot program stored therein has been erased.

The above-described embodiment assumes that the nonvolatile memory 1 is divided into two areas, namely, the user areas A11 and B12, in order to simplify the explanation. For this reason, a single bit data "1" or "0" is set in the boot area designation flags A21 and B22.

However, in reality, there are many cases where the nonvolatile memory 1 is divided into three or more areas. In such cases, the number of bits of a boot area designation flag, which is provided for every user area, is two bits or more as much as necessary to distinguish the individual divided areas. For instance, two bits are required for each boot area designation flag when the number of divided areas is three or four, and three bits are required for each boot area designation flag when the number of divided areas is any one of five to eight.

Further, it is possible to record the history of rewriting of the user areas by setting the boot area designation flags, each of which is comprised of a plurality of bits, to the value corresponding to the number of times of rewriting of the user areas.

More specifically, the following process makes it possible to record the history of the rewriting. First, the CPU 2 sets all the bits of each boot area designation flag to "1" in order to indicate that no bootable user areas are present. Thereafter, when the CPU 2 writes a boot program into a certain user area, the CPU 2 sets the lowest bit of the corresponding boot area designation flag to "0" so as to indicate that this user area is a bootable user area. Moreover, when the CPU 2 rewrites a boot program the next time, the CPU 2 sets to "0" the lowest bit and the adjacent higher bit of the boot area designation flag corresponding to the user area where the boot program is rewritten.

Additionally, when the system is started, the CPU 2 reads out a boot program from the user area corresponding to the boot area designation flag that has the maximum number of bits set to "0" among all the boot area designation flags. The number of "0" bits contained in data to be stored in a boot area designation flag is increased by one in the direction from the lowest bit toward the highest bit each time one of the user areas is rewritten. Therefore, the CPU 2 can determine the user area where the latest boot program is stored, so that the system can be started in accordance with the latest boot program.

Here, after the boot program corresponding to the boot area designation flag in which all bits are set to "0" has been rewritten, and then when the boot program stored in a user area is rewritten, the CPU 2 sets the boot area designation flag corresponding to this user area to the data in which the lowest bit contains "0" and all the other bits contain "1." As a result, the CPU 2 can determine that the user area corresponding to this boot area designation flag includes the latest boot program.

Although an embodiment of the present invention has been described with reference to the figures, the present invention should not be restricted only to this embodiment, but any modification thereof made without departing from the spirit of the present invention should be construed to fall within the scope of the present invention.

For example, the computer may be a one-chip microcomputer in which a CPU, a nonvolatile memory, a boot memory, and area designation flags are mounted in a single chip. Conversely, the computer may also be a system that is comprised of a plurality of chips.

Additionally, although the CPU 2 in the above-described embodiment controls the rewriting operation of a boot program by using the old boot program, a sequencer instead of the CPU 2 may carry out the same rewriting operation in accordance with a rewriting procedure stored therein.

What is claimed is:

1. A computer comprising:
   a nonvolatile memory divided into a plurality of divided areas, each divided area being separately erasable and including a user area and a boot area designation flag indicating whether the user area is specified as a boot area;
   an area designation flag register specifying the user area that includes a boot program among a plurality of user areas; and
   a processor setting a value of said area designation flag register based on values of a plurality of boot area designation flags, said processor writing a new boot program into a user area where no boot program is included, setting a value of a boot area designation flag corresponding to the user area to indicate the user area is specified as a boot area, updating a value of the area designation flag register to specify the user area that includes the new boot program, and rewriting the user area where the boot program was included,
   wherein the user area which stores programs for staring the operation of said processor is determined based on the value of said area designation flag register.

2. A computer according to claim 1, further comprising: a boot memory which stores a predetermined program to be executed by said processor,
   wherein, by executing said predetermined program at start-up of the computer in a user mode in which a user operates the computer, said processor sets the value of said area designation flag register to data for specifying the user area including the boot program based on the values of said plurality of boot area designation flags, and subsequently executes said boot program stored in the user area specified by said area designation flag register.

3. A computer according to claim 1, wherein said boot area designation flag is comprised of a plurality of flags, and said processor sets the value of said area designation flag to data according to a number of times of rewriting of said user areas so as to record a history of rewriting of said user areas.

4. A computer according to claim 3, wherein said processor sets a first predetermined value in every bit of the data to be written into a boot area designation flag, and changes the number of bits of a second predetermined value included in said data to be written into another boot area designation flag each time one of said user areas is rewritten, and determines the user area in which the latest boot program is stored based on the number of bits of said second predetermined value included in respective boot area designation flags.

5. A computer according to claim 1, wherein said computer is a singles chip microcomputer in which said processor, said nonvolatile memory, and said area designation flag register are mounted in a single chip.

6. A computer according to claim 1, wherein said computer is a system in which said processor, said nonvolatile memory, and said area designation flag register are mounted in a plurality of chips.

7. A computer according to claim 1, wherein said processor rewrites programs including a boot program by executing programs that are stored in the user area containing the old boot program.

8. A computer according to claim 1, wherein said processor is a sequencer which stores a predetermined rewriting procedure, and rewrites programs including a boot program that are stored in a user area in accordance with said rewriting procedure.

9. A computer according to claim 2, wherein said computer is single chip microcomputer in which said processor, said nonvolatile memory, said boot memory, and said area designation flag register are mounted in a single chip.

10. A computer according to claim 2, wherein said computer is a system in which said processor, said nonvolatile memory, said boot memory, and said area designation flag register are mounted in a plurality of chips.

* * * * *